(12) United States Patent
Goto et al.

(10) Patent No.: US 7,809,556 B2
(45) Date of Patent: Oct. 5, 2010

(54) ERROR CONCEAL DEVICE AND ERROR CONCEAL METHOD

(75) Inventors: Michiyo Goto, Kanagawa (JP); Chun Woei Teo, Singapore (SG); Sua Hong Neo, Singapore (SG); Koji Yoshida, Kanagawa (JP)

(73) Assignee: Panasonic Corporation, Osaka (JP)

( * ) Notice: Subject to any disclaimer, the term of this patent is extended or adjusted under 35 U.S.C. 154(b) by 995 days.

(21) Appl. No.: 10/591,601

(22) PCT Filed: Mar. 1, 2005

(86) PCT No.: PCT/JP2005/003407

§ 371 (c)(1),
(2), (4) Date: Nov. 14, 2006

(87) PCT Pub. No.: WO2005/086138

PCT Pub. Date: Sep. 15, 2005

(65) Prior Publication Data

US 2007/0198254 A1    Aug. 23, 2007

(30) Foreign Application Priority Data

Mar. 5, 2004    (JP) .............................. 2004-061797

(51) Int. Cl.
*G10L 19/10* (2006.01)
(52) U.S. Cl. .................. 704/219; 704/226; 704/228; 704/221; 704/233; 714/747; 714/755; 714/761; 714/766; 375/240.16; 375/240.01

(58) Field of Classification Search .................. 704/219, 704/226–228, 221, 233; 714/747, 755, 761, 714/746, 765, 756; 375/240.16, 240.01
See application file for complete search history.

(56) References Cited

U.S. PATENT DOCUMENTS

| | | | | |
|---|---|---|---|---|
| 5,077,798 | A | * | 12/1991 | Ichikawa et al. ............ 704/222 |
| 5,353,373 | A | * | 10/1994 | Drogo de Iacovo et al. . 704/223 |
| 5,384,891 | A | * | 1/1995 | Asakawa et al. ............ 704/220 |

(Continued)

FOREIGN PATENT DOCUMENTS

EP    0 718 982    6/1996

(Continued)

OTHER PUBLICATIONS

European Search Report dated Jul. 31, 2009.

(Continued)

*Primary Examiner*—Vijay B Chawan
(74) *Attorney, Agent, or Firm*—Dickinson Wright PLLC

(57) ABSTRACT

The conventional error conceal processing generates a greatly fluctuating irregular sound which is unpleasant to ears and causes a remarkable echo effect and click noise. A notification signal detection unit (301) judges processing for an input frame. In case of an error frame, a sound detection unit (303) makes judgment whether a preceding non-error data frame is a sound signal. If it is a sound frame, a sound copying unit (304) generates a replacing frame. If it is a non-sound frame, a transient signal detection unit (305) judges whether it is an attack signal by the transient signal detection and selects an appropriate area from the preceding non-error frame.

9 Claims, 10 Drawing Sheets

U.S. PATENT DOCUMENTS

| | | | | |
|---|---|---|---|---|
| 5,414,796 A * | 5/1995 | Jacobs et al. | ............... | 704/221 |
| 5,450,449 A * | 9/1995 | Kroon | ............... | 375/350 |
| 5,615,298 A * | 3/1997 | Chen | ............... | 704/228 |
| 5,884,010 A * | 3/1999 | Chen et al. | ............... | 704/228 |
| 6,081,778 A * | 6/2000 | Wong et al. | ............... | 704/227 |
| 6,597,961 B1 | 7/2003 | Cooke | | |
| 6,850,559 B1 * | 2/2005 | Driessen et al. | ............... | 375/219 |
| 6,885,988 B2 * | 4/2005 | Chen | ............... | 704/228 |
| 7,003,448 B1 | 2/2006 | Lauber | | |
| 7,042,933 B2 * | 5/2006 | Driessen et al. | ............... | 375/219 |
| 7,406,411 B2 * | 7/2008 | Chen | ............... | 704/228 |
| 2005/0182996 A1 * | 8/2005 | Bruhn | ............... | 714/752 |

FOREIGN PATENT DOCUMENTS

| | | |
|---|---|---|
| EP | 1 291 851 | 3/2003 |
| EP | 1458145 | 9/2004 |
| JP | 2001 203648 | 7/2001 |
| JP | 2003 218932 | 7/2003 |
| WO | 94/29849 | 12/1994 |
| WO | 00/68934 | 11/2000 |

OTHER PUBLICATIONS

International Search Report dated Jun. 7, 2005.

Ismo Kauppinen et al., "Audio Signal Extrapolation—Theory and Applications," Proc. of the $5^{th}$ Int. Conference on Digital Audio Effects (Dafx-02), Hamburg, Germany, pp. 105-110, Sep. 26-28, 2002.

Y. Wang, "A Beat-Pattern based Error Concealment Scheme for Music Delivery with Burst Packet Loss," IEEE International Conference on Multimedia and Expo, Aug. 2001, p. 73-75.

* cited by examiner

ERROR CONCEAL DEVICE AND ERROR CONCEAL METHOD

TECHNICAL FIELD

The present invention relates to a technology for concealing lost or corrupted digital audio signals (errors) in the area of transmission, delivery and storage medium.

BACKGROUND ART

When transmitting information packets or frames, whether by way of wired or wireless means, some of these packets may be lost or get corrupted. Even with the increase of bandwidth and improvement of network or transmission technologies, such losses cannot be completely avoided.

In the case where a speech packet or audio packet is lost or get corrupted, such loss or corruption may result in audible artifacts, degrading of audio quality and unperceptive audio content. The degradation is especially annoying during real-time streaming or transmission.

In order to minimize such degradation, error concealment scheme is employed. The fundamental idea is to replace the error data with some synthesis or generated data. The purpose of error concealment, as the name implies, is to hide or mask the error resulted from data loss and/or data corruption during transmission, reception, storage, encoding or decoding processing so that in the best case the error will not be noticed or at least not so apparent.

There are numerous schemes and techniques of error concealment, which targets speech data and audio data. Some are sender-assisted, while others are receiver-based. For sender-assisted method, the sender side will retransmit lost or corrupted information or embeds error correction information in the transmitted information so that lost data can be recovered. For receiver-based schemes, information from the sender is not required to assist in concealing the lost data. This is intended to make data function by replacing the lost or corrupted data with some useful information, and this information is usually an estimate of what has been lost or corrupted. These replacement data are generated at the receiver side without assistance from the sender.

There are various techniques for receiver-based error concealment scheme. The simpler method include muting and data repetition. Muting simply replaces the error data with silence or zero values that is of the same duration as the error data, whereas data repetition simply replaces the error data with the most recent non-error data.

Using a data interpolation technology (e.g., see non-Patent Document 1) makes it possible to obtain a better result compared to the above-mentioned simple techniques. This technique tries to reconstruct replacement data by interpolation from non-error data adjacent to error data.

Furthermore, there are more complex methods, which are codec dependent in that it is optimized for a particular type of speech or audio codec. This method regenerates data to replace lost data using the knowledge of the audio compression algorithm to derive the codec parameter.

FIG. 1 is a flow chart showing a procedure of an error concealment technique which incorporates the muting, duplication and interpolation error concealment processing.

When a frame of audio data is received, it is examined in ST101 whether or not this is an error frame. When this is not an error frame, the received data is stored in a memory in ST102 for future use, probably during interpolation processing in ST107. When the received frame is detected as an error frame in ST101, a series of decisions are made in ST103 and ST105 to decide which of the error concealment techniques is most suitable to be applied to the current error frame based on the previous and/or future non-error frame if delay is allowed in the system. In ST103, it is checked if the current error frame is suitable to be muted. When muting is chosen, the current error frame is replaced with zero data in ST104. That is, the current error frame is replaced with silence. When muting is not suitable for this error frame, it is checked in ST105 if interpolation can be carried out for this frame. When interpolation is not suitable, for example, in burst error or there is no delay to buffer future data, the last non-error frame will be repeated in the current error frame in ST106. When interpolation is selected in ST105, interpolation processing is performed in ST107 using the data stored in ST102.

Non-patent Document 1: I. Kauppinen et al. "Audio Signal Extrapolation—Theory and Applications" Proc. of 5th Int. Conf. on Digital Audio Effect, September 2000

DISCLOSURE OF INVENTION

Problems to be Solved by the Invention

For sender-based error concealment schemes, retransmission leads to longer delay, and there is a problem that embedded information for error recovery increases transmission overhead. Such situations are not suitable for application such as real-time communication or transmission systems.

Although receiver-based does not need retransmission or additional information from the sender, there is also a disadvantage such as increase in the computation load at the receiver side. But the increase in computation is usually immaterial as the receiver end usually has sufficient power to cope with it. Another advantage is that it is more suitable for real-time systems due to the absence of retransmission delay and overhead. However, the simple receiver-based error concealment techniques as shown in the above described technology cannot produce good error concealment results.

Muting will cause the received signal to disappear suddenly, which results in a sudden change in the sound level. When muting is used, the occurrence of a burst error may cause a long period of silence. When a consistent error is received, this will also sound "jerky".

Repetition or duplication results in echo effect. This effect will deteriorate when there is a burst error for a long duration. Moreover, since frames are simply replaced without signal characteristics of adjacent frames taken into consideration, there is a problem of irritating "clicking" noise artifact caused by the boundary discontinuity problem. But it gives slightly better concealment result compared to muting for a single frame error but still suffer for a burst error.

Interpolation also produces some "clicking" noise artifact caused by boundary discontinuity problem. The conceal quality for a single frame error is better than muting and duplication, but degrades significantly for a burst error. These techniques although simple and easy to implement but does not produce a pleasing concealment result.

The codec dependent scheme brings about better results but cannot yet be said to be sufficient in terms of versatility. Usually, this scheme can only be used by a specific application or a specific speech or audio codec. A number of codec dependent schemes work in the compressed domain by predicting the parameters used by the specific codec. Such schemes usually require a higher computation cost.

It is therefore an object of the present invention to provide an error concealment technique for speech signals or audio signals which makes influences of error concealment as indistinguishable as possible.

Means for Solving the Problem

The present invention classifies speech data or audio data into different characteristics and applies appropriate means for generating replacement data to conceal error data.

FIG. 2 shows the main configuration of an error concealing apparatus according to the present invention.

Speech data or audio data can come from various media, for example, received from storage medium (or transmission system via a wired or wireless network) 200. These data are packed into a frame or packet which usually takes a compressed format. When the packet is received, an appropriate speech or audio decoder 250 is used to decode the packet packed into a frame in a non-compressed audio format suitable for playback. Verification is performed at every stage to ensure that the received packet is not lost or corrupted and that there is no error in decoding the received packet. When errors have occurred at any stage, the errors are signaled to error concealment processing section 300 to conceal error frames.

The internal configuration of error concealment processing section 300 according to the present invention is shown in the block diagram in FIG. 3.

A signal for signaling to indicate whether each frame is an error frame or non-error frame is sent to all frames. Report signal detection section 301 detects this signal and decides the action to be taken with the frame of the input data. Non-error frames are stored in sample storage section 302 and the same frames of data are sent out for playback or storage. The stored data will be used by speech detection section 303, transient signal detection section 305 and extrapolation processing section 307 when an error frame is generated in the future. In the case of an error frame, speech detection section 303 makes a judgment as to whether it is a speech signal or non-speech signal on the previous frames of non-error data. In the case of a speech frame, by carrying out pitch computation and duplication using speech duplication processing section 304, a replacement frame for concealing the error frame is generated. In the case of a non-speech frame, transient signal detection section 305 detects a transient signal and determines whether or not the signal is an attack signal. Next, transient signal detection section 305 chooses a suitable region as a region including a transient signal (hereinafter referred to as "transient region") from previous non-error frames for filterbank analysis section 306. Filterbank analysis section 306 produces N subbands through filter bank analysis. These subbands can be equal or unequal to bandwidths. These subbands are sent to extrapolation processing section 307 where subband samples for error concealing are extrapolated and replacement subband data for the current error frame is generated. Filterbank synthesis section 308 reassembles subband data to form a frame of generated data using a synthesis filterbank together with the subband data generated by extrapolation processing section 307. The generated data is sent to post processing section 309 before being stored in and sent out from sample storage section 302 to solve the issue of frame boundary discontinuity problem and signal level mismatch.

The internal configuration of extrapolation processing section 307 is shown in the block diagram in FIG. 4.

In order to determine whether or not there is a significant contribution to an overall signal, first check section 401 performs first check on each subband. Extrapolation is not performed on subbands considered unimportant, but the subbands are replaced with zeros at silence replacement section 402 instead. For subbands considered as important, filter coefficient computation section 403 computes a filter coefficient to be used for an extrapolation filter. In order to determine to what extent of periodicity subbands have and whether or not the subbands are predictable (hereinafter referred to as "predictability level"), second check section 404 also performs second check on these subbands. In the case of subbands which have no periodicity and which are classified as non-predictable, these subbands are considered to be noise-like, and therefore subband replacement section 407 replaces noise data with this subband data using a noise replacement section or replaces subband data with the same subband from the previous frame. In the case of subbands which have periodicity and which are classified as predictable, filter order adjusting section 405 adjusts the filter order of the extrapolation filter based on the predictability level derived from second check section 404. Extrapolation section 406 performs extrapolation of subband samples on these subbands using an extrapolation filter commonly found in the prior art of filtering.

ADVANTAGEOUS EFFECT OF THE INVENTION

According to the present invention, it is possible to effectively conceal lost or corrupted frames.

BEST MODE FOR CARRYING OUT THE INVENTION

Figure 1:
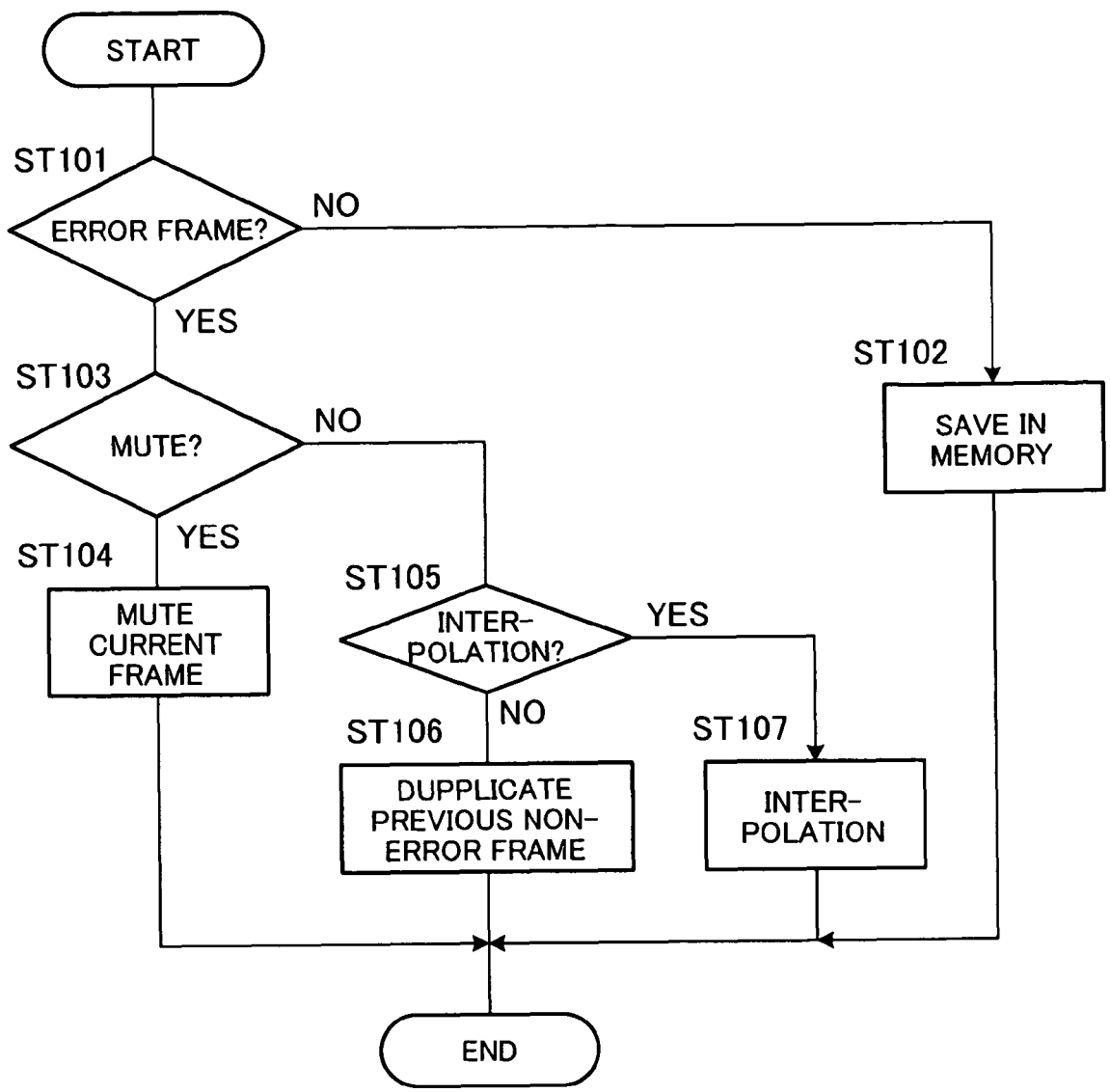
FIG. 1 is a flow chart showing a procedure of an error concealment techniques which incorporates various types of error concealment processing.
Figure 2:
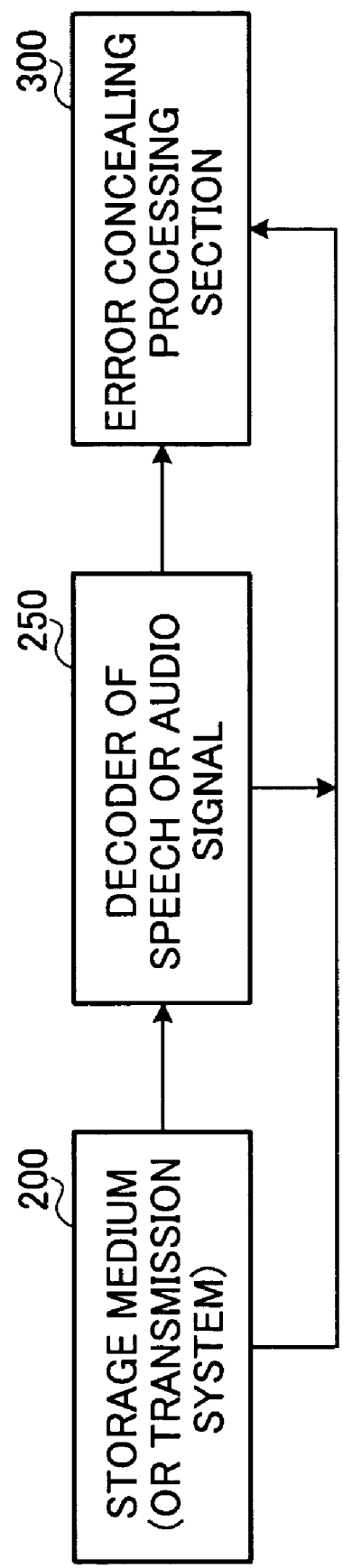
FIG. 2 shows the principal configuration of an error concealing apparatus according to the present invention.
Figure 3:
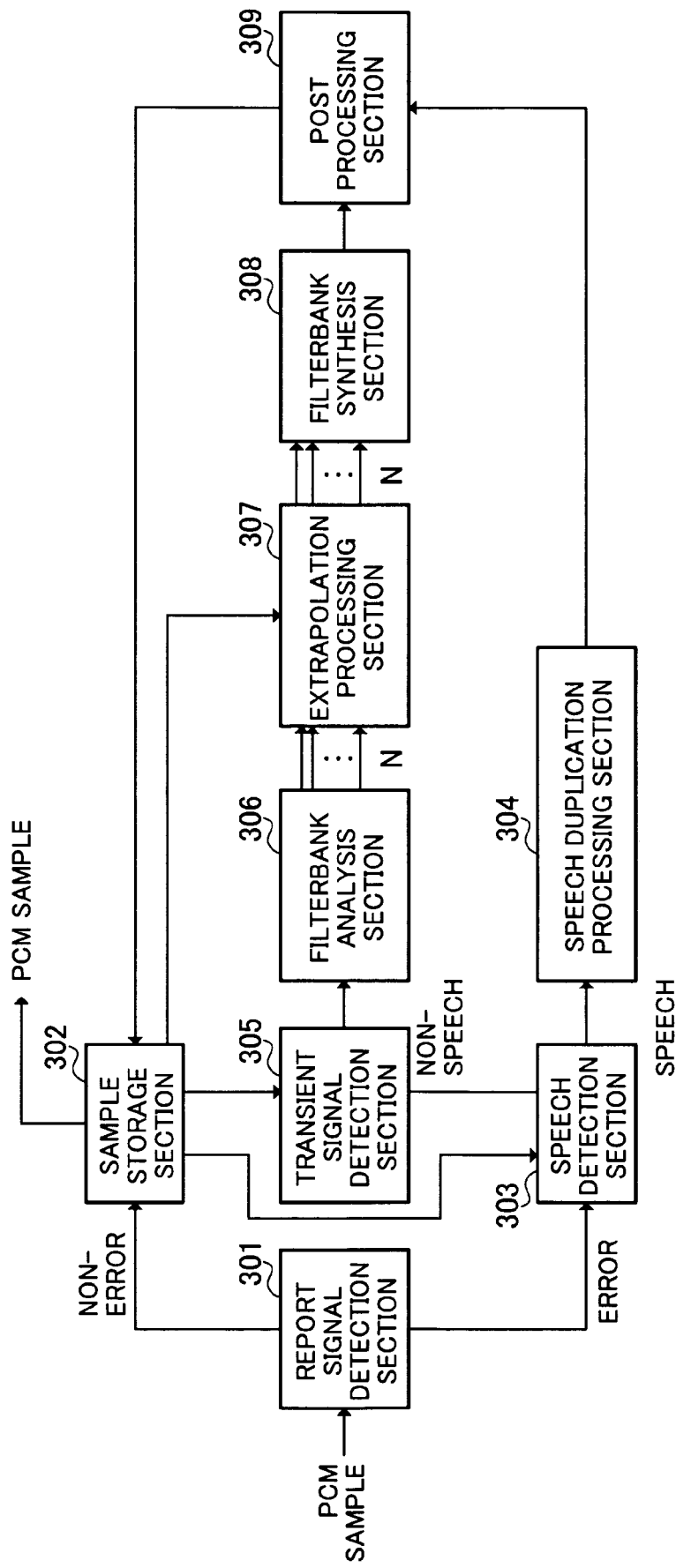
FIG. 3 is a block diagram showing the internal configuration of the error concealment processing section according to the present invention.
Figure 4:
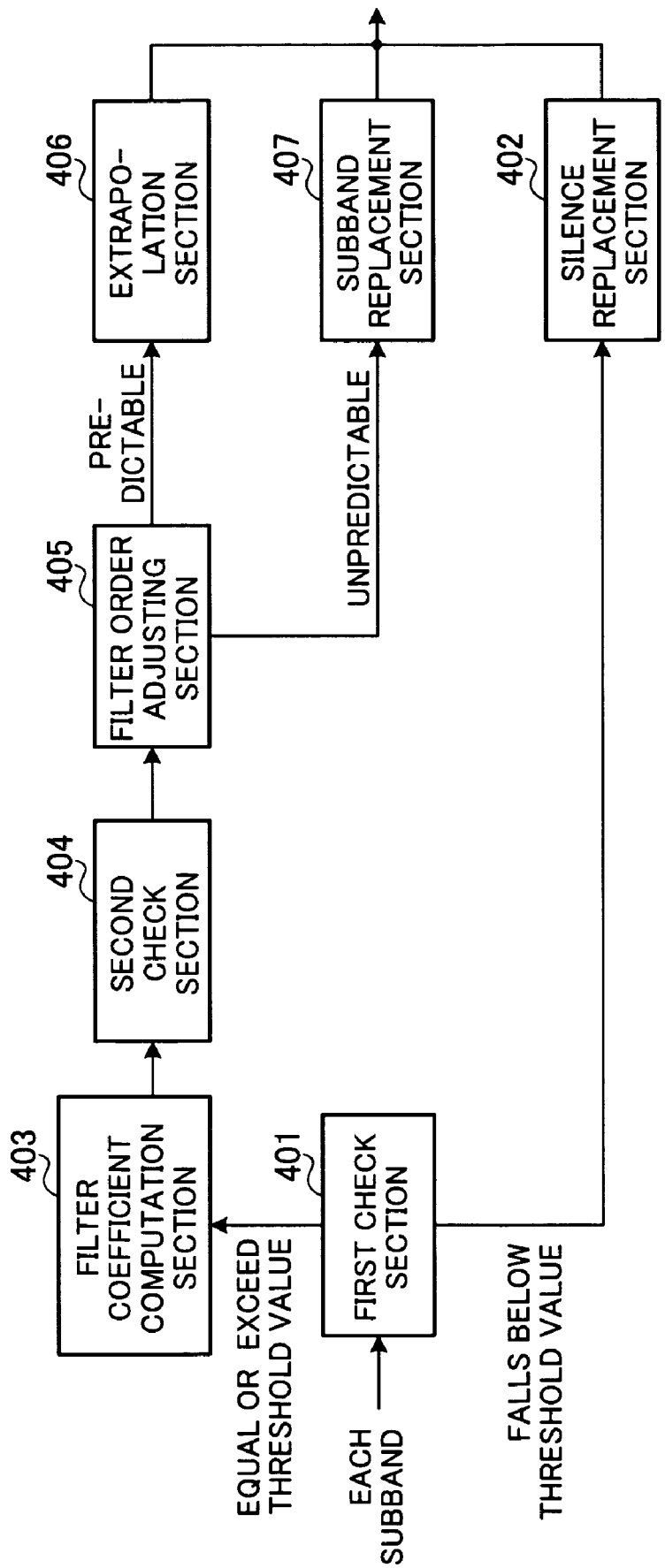
FIG. 4 is a block diagram showing the internal configuration of the extrapolation processing section according to the present invention.
Figure 5:
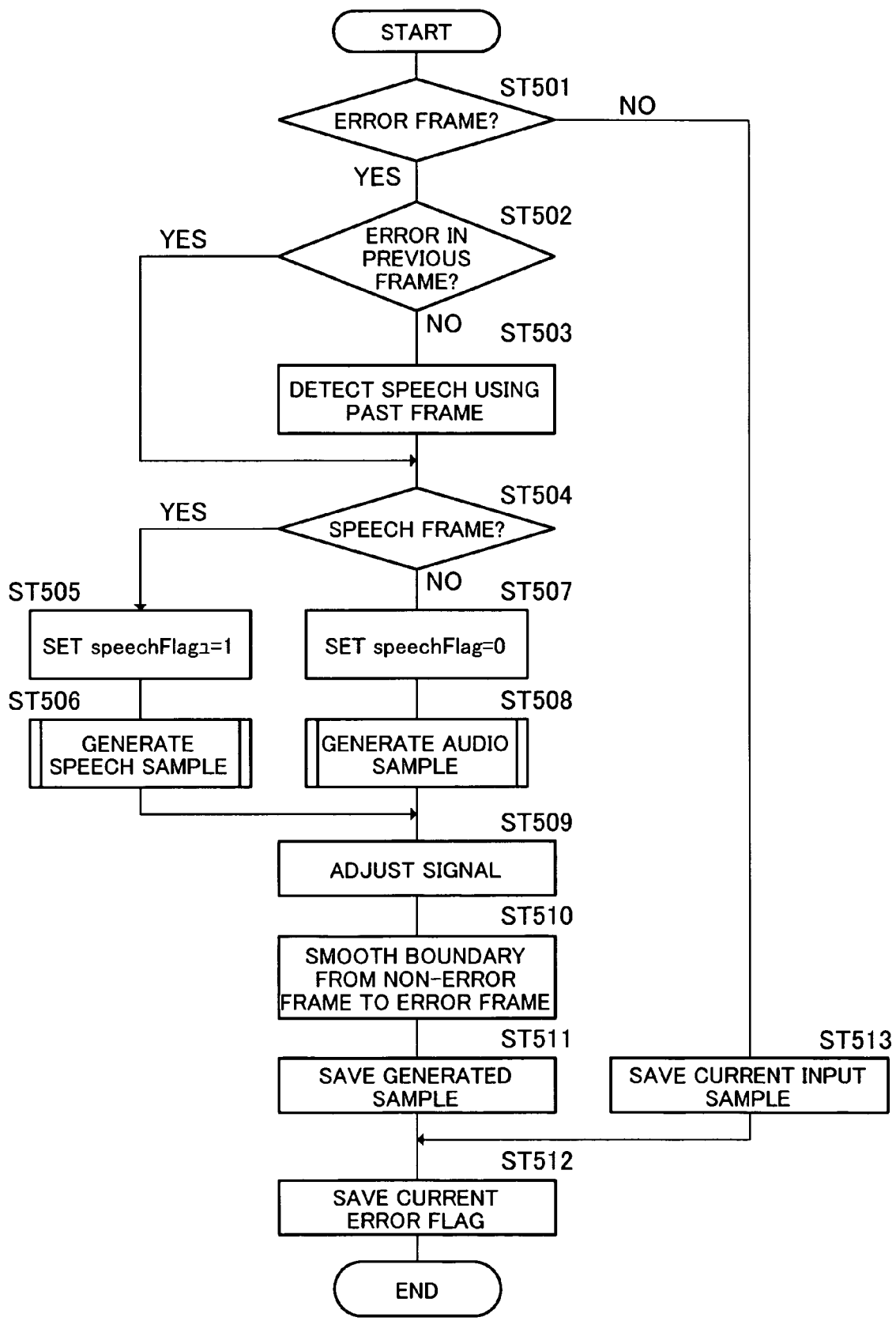
FIG. 5 is a flow chart showing detailed steps of an error concealment algorithm according to Embodiment 1.
Figure 8:
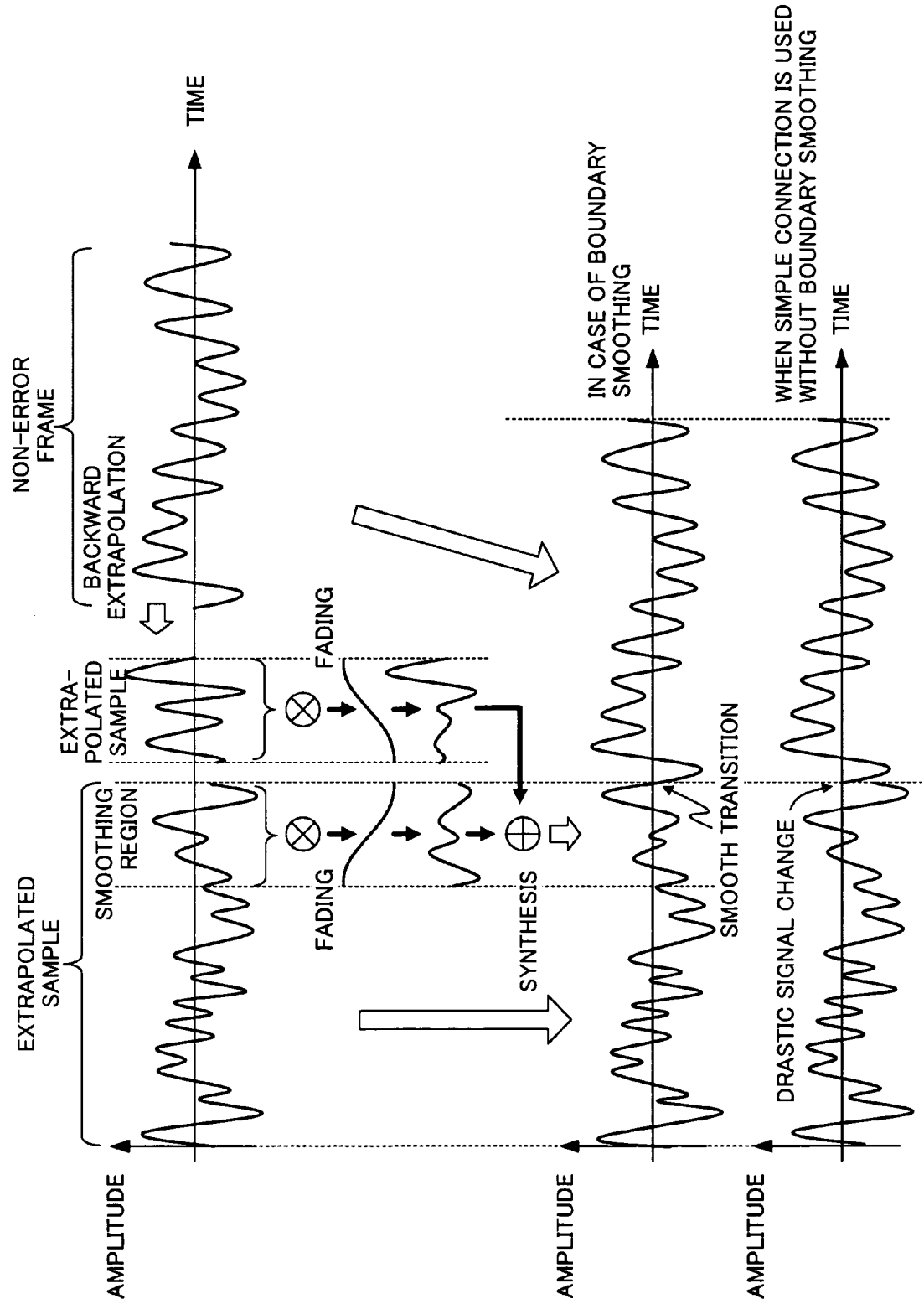
FIG. 8 shows frame boundary smoothing processing according to Embodiment 1.
Figure 9:
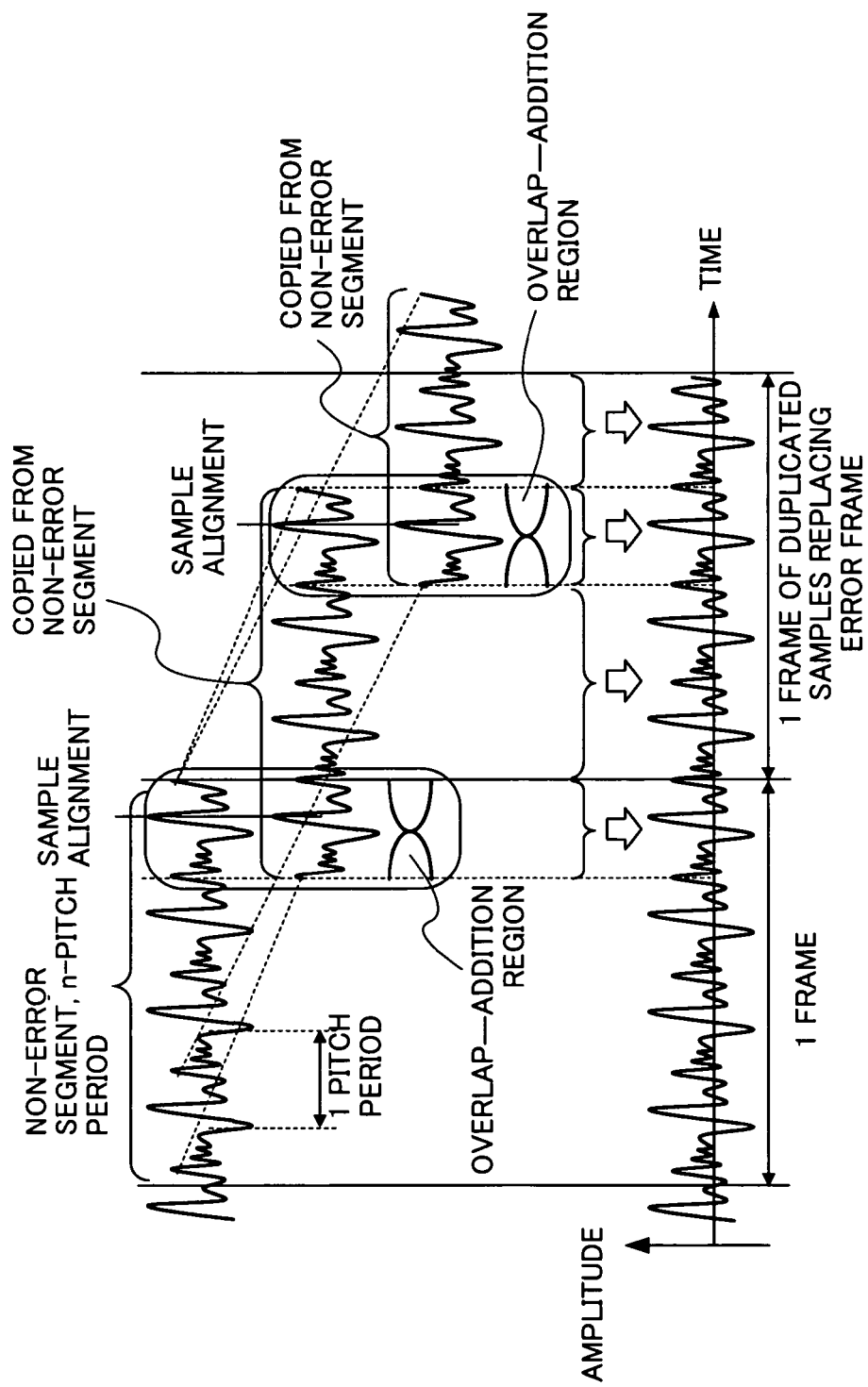
FIG. 9 illustrates a signal obtained through the speech sample generation processing according to Embodiment 1.
Figure 10:
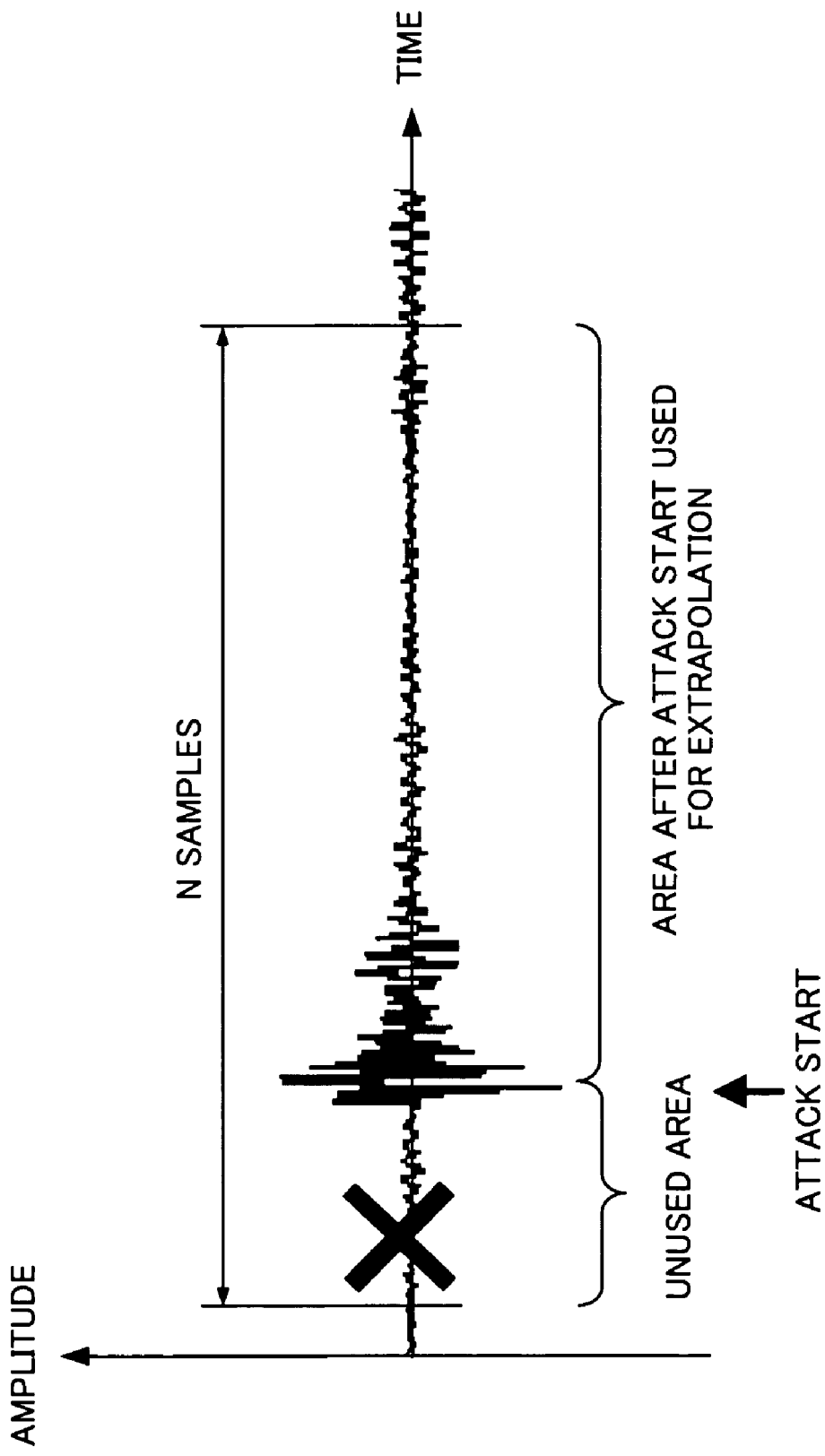
FIG. 10 illustrates detection of an attack signal according to Embodiment 1.

Now, an embodiment of the present invention will be described in detail with reference to a series of flow charts in FIG. 5 to FIG. 7 and explanatory diagrams in FIG. 8 to FIG. 10.

EMBODIMENT 1

First, a main framework will be explained. FIG. 5 is a flow chart showing detailed steps of an error concealment algorithm according to Embodiment 1. A received frame is classified as non-error frame, error frame as speech or error frame as audio.

A non-error frame will be processed as follows.

In ST501, it is detected whether a received audio frame is an error frame or non-error frame. When a non-error frame is received, the frame is stored in a memory in ST513 so that it can be used when an error frame is received in the future. This memory has a first-in first-out (FIFO) structure and can store n frames of past audio samples. A standard size of the memory can be set to 2 frames and the most recent past two frames of a sample are stored in the memory. When a new audio frame arrives, the oldest frame out of the n frames in the memory is discarded and the new frame is concatenated to the remaining frames in the memory. Next, in ST512, an error flag of a current frame is stored as a previous error flag. This flag is used in ST502 to check whether the previous frame is an error frame or non-error frame.

The type classification of error frames when an error frame is detected is performed as follows.

When an error frame is detected in ST501, in order to determine whether the current error frame is a speech type (that is, periodic) frame or audio type (that is, non-periodic) frame, classification is performed in ST504. Prior to that, it is checked in ST502 whether or not this is a first error frame following the non-error frame, that is, whether or not the previous frame is an error frame.

When the previous frame is a non-error frame, it is detected in ST504 whether the error frame is a speech type frame or audio type frame using past samples stored in the memory. These past samples are basically previous non-error frames stored in ST513. A speech detection algorithm commonly found in the prior arts of speech coding can be used in ST503. One simple method is a method of applying auto-correlation to a non-error frame prior to an error frame and searching for periodicity and pitch information. The information is stored for future use.

The processing on an error frame classified as speech will be performed as follows.

When the error frame is classified as a speech type frame in ST504, a speech flag is set to 1 in ST505. The speech flag is used in the case of such a burst error in which many consecutive frames result in errors. In such a case, only the first error frame of a series of error frames passes through speech detection in ST503 and subsequent consecutive error frames need not pass through detection again and the results already acquired in the first detection in ST503 are continued to be used. That is, when the previous frame is also detected to be an error frame in ST502, since detection has already been performed with the first error frame, the speech detection in ST503 is skipped. That is, it is determined whether the frame type is a speech type or audio type using the speech flag. For a speech type signal, in ST506, the current error frame is replaced and a sample is generated to conceal or minimize errors using speech sample generation processing. ST506 will be explained using FIG. 6 later.

Processing on an error frame classified as audio will be performed as follows.

When the current frame is classified as an audio type frame in ST504, the speech flag is set to 0 in ST507. In this case, a sample is generated to replace the current error frame and conceal errors using audio sample generation processing in ST508. ST508 will be explained in detail using FIG. 7 later.

Processing called a "post processing" will be performed as follows.

After the sample for concealing an error is generated, signal adjustment is performed on the generated sample. An object of this signal processing is to reduce audible artifacts such as "clicking" noise and "popping" noise caused by a sudden change in signal characteristic in transiting between a non-error frame and error-concealed frame at the frame boundary. For example, the generated error-concealed sample may have a signal level or power which is considerably different from the prior non-error frame. Therefore, the generated sample is adjusted so as to match the signal level prior to the error frame in ST509.

When the error-concealed sample is generated, it may not join well with frames following the error-concealed frame. This will result in discontinuity problem at the frame boundary. This problem is coped with by executing boundary smoothing processing in ST510. An effective method to cope with this problem is frame boundary smoothing processing shown in FIG.8 using backward extrapolation and signal mixing.

It also illustrates the possible side effect of not using any means of boundary smoothing processing. One of such side effects is a discontinuity problem when a sudden change occurs in a signal as shown in the lower part of FIG. 8. After the post processing, the generated sample is stored in ST511. The current error flag is also stored as a previous error flag in ST512. This flag is used in ST502 to check whether the previous frame is an error frame or non-error frame.

Figure 6:
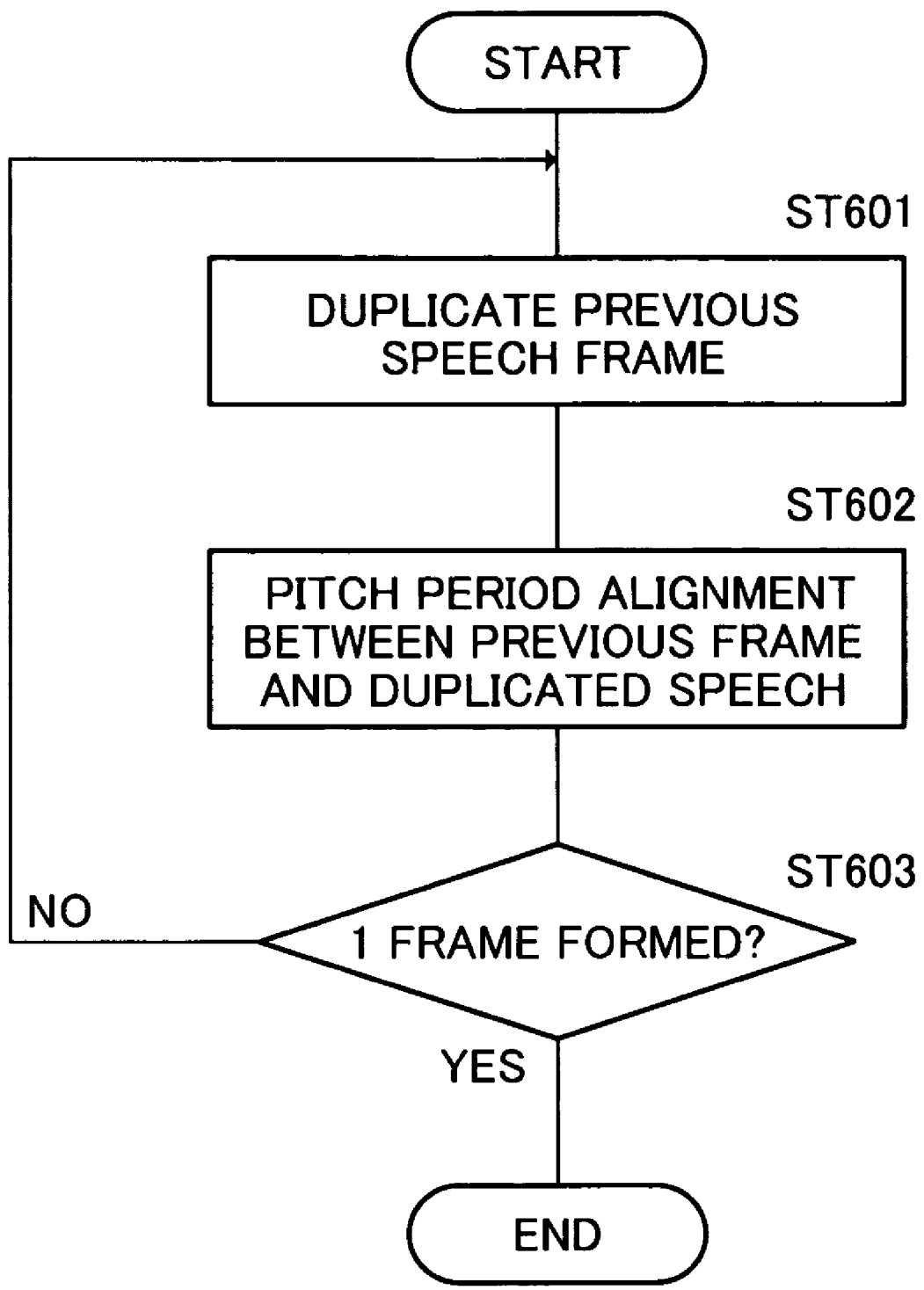
FIG. 6 is a flow chart showing a detailed procedure of speech sample generation processing according to Embodiment 1.

FIG. 6 shows a flow chart showing a detailed procedure of speech sample generation processing (ST506 in FIG. 5) when the error frame is classified as a speech type. This flow chart presents a simple method as a method for deriving a speech sample. A signal obtained through the speech sample generation processing shown in FIG. 6 is shown in FIG. 9.

In ST601, a segment (part of a frame) is copied from the previous non-error frame using the pitch information obtained during classification of frame type in ST503. This segment is a multiple of the pitch period found in ST503, but it is less than 1 frame. Pitch alignment in ST602, that is, the replacement position of a duplicated frame is adjusted such that the pitch period of the duplicated frame is in alignment with the pitch period of the previous frame. This is intended to secure continuity for the periodicity from the non-error frame to the duplicated frame. This duplication and alignment are repeated until one full replacement frame capable of replacing an error frame is obtained in ST603. In the above described duplication, it is also possible to ensure that the pitch period of the duplicated frame matches the pitch period of the previous frame by adjusting the duplication segment, that is, repeating the duplication until a replacement frame capable of replacing the error frame is obtained.

Figure 7:
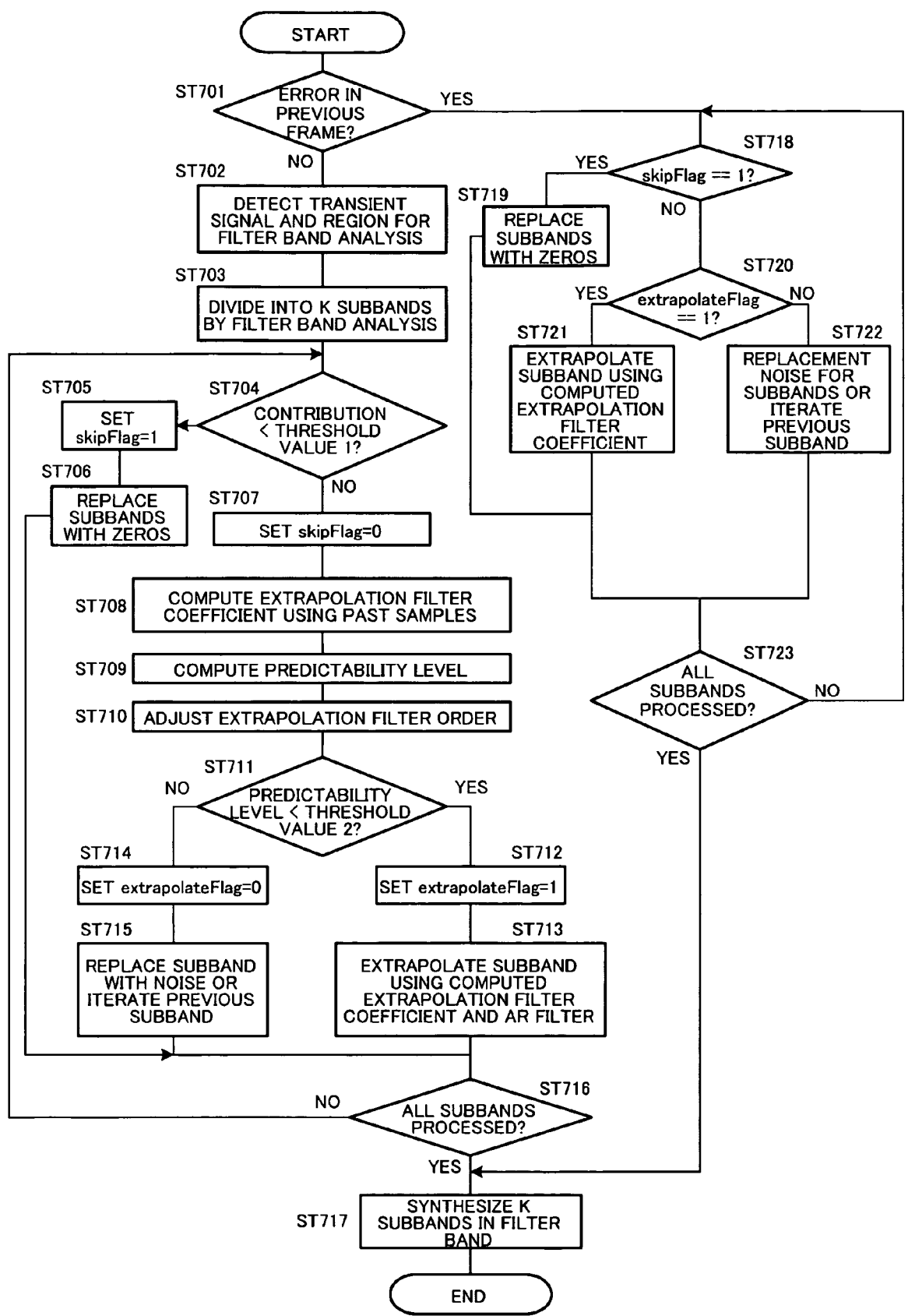
FIG. 7 is a flow chart showing a detailed procedure of audio sample generation processing according to Embodiment 1.

FIG. 7 is a flow chart showing a detailed procedure of audio sample generation processing (ST508 in FIG. 5) when an error frame classified as an audio type is detected.

A sample generated to conceal an error frame is mainly derived from a non-error sample (from ST513) prior to an error frame. Normally, these perfect samples without any loss include information, from which, when extracted, it is possible to obtain a clue as to what a subsequent signal will be like. There are two paths in this processing. One is a path used when the frame prior to this error frame is a non-error frame. The other path is used when the previous frame is also an error frame.

The following processing is performed on a new error frame.

In ST701, an error status of the previous frame is checked. When the previous frame is not an error frame, this means that the current error frame is the first error frame following the non-error frame. Here, the current error frame is defined as frame E and the non-error frame prior to the error frame is defined as frame P.

In ST702, detection of an attack signal is performed on frame P. This detection of an attack signal will be explained in FIG. 10. When frame P includes no attack signal, the entire frame is used in filter band analysis in ST703 that follows. When an attack signal is detected in frame P, the start position of the attack signal is confirmed and samples ahead of the attack signal in frame P are discarded. That is, only samples after the start position of the attack signal are used for subsequent filter band analyses. As described above, the generated samples are derived from the signal characteristics of frame P. Since the generated signal is modeled after frame P, samples (regions) before the start position of the attack signal are not excluded in the subsequent processing, and therefore a similar but smaller version (similar attack signal) of the attack signal from frame P will usually appear in the generated signal. Such a "double attack" is very offensive to the ear, and therefore this is not desirable. An advantage in performing the above described detection is that it is possible to reduce the problem of the "double attack" of a generated signal to a minimum by excluding unnecessary portions of the signal, that is, regions before the start position of the attack signal through the subsequent processing.

After excluding the unnecessary portions from frame P and selecting a suitable region, the signal is divided into a plurality of frequency bands, that is, K subbands using analysis filterbank in ST703. Bandwidths of the respective subbands need not be the same. That is, bandwidths of subbands may or may not be identical. When, for example, when a frame having a length of L and consisting of K subbands exists, one possible subband configuration is that each subband of the first K/4 subbands has a bandwidth of L/(2K) samples. For the next K/4 subbands, each subband has a bandwidth of L/K samples and each subband of the last K/2 subbands has a bandwidth of 2L/K samples. That is, when a subband is lowered, the bandwidth of the subband is reduced accordingly, and, as a result, higher frequency resolution is thereby provided. When a subband increases, the bandwidth thereof also increases accordingly. Another possible configuration is to allow all subbands to have the same bandwidth of L/K samples.

Several parameters are derived from the subband samples for each subband. First, to determine the amount of contribution to the overall signal and whether or not the contribution can be considered important, a parameter is computed. One possible method to derive this parameter is to compute $\Sigma\{\log[\text{abs}(S_i+\eta)]\}/L_{sb}$, where $S_i$ is a subband sample, $\eta$ is a small value to prevent underflow, and $L_{sb}$ is the length of a subband (that is, bandwidth). This parameter is compared with a threshold value in ST704. When the parameter falls below this threshold value, flag "skipFlag" is set to "1" in ST705, which indicates that this subband is excluded from the signal generation processing, and the subband is replaced with zero in ST706, and the process moves to the next subband in ST716. When the parameter exceeds the threshold value, the skip flag is set to "0" in ST707, which indicates that this subband is included in the signal generation processing, and the step is not skipped. This skip flag will be used in the subsequent frame when the subsequent frame is also determined to be an error frame in ST718.

Signal extrapolation is used for audio sample generation processing in ST713 and ST721 of the present invention. In ST708, this method uses a segment of a known audio signal to derive a set of impulse response coefficients $a_{sb,i}$ using Berg's algorithm. These coefficients incorporate known signals (previous non-error frame in this case) to acquire a series of linearly predictable signals used to replace and conceal the current error frame as shown in (Equation 1) below. This signal extrapolation method is merely one means for generating an appropriate signal set that can be used to conceal error frames, but other methods can also be used.

Another computed parameter is predictability level $Pr_{sb}$ in ST709. This parameter is used to gauge how predictable the signal is for each subband. This parameter is derived from a predicted error residue computed from Berg's algorithm. Before starting iteration of Berg's algorithm, initial error residue $E_0$ is computed. This error residue is updated every time coefficient computation processing is iterated and final predicted error residue $E_1$ is returned after the final iteration. With regard to the relationship between predictability level $Pr_{sb}$ and error residue rate $E_0/E_1$, when the ratio $E_0/E_1$ is small, the predictability level is lowered accordingly, and the opposite is also true. This means in other words that a lower $E_0/E_1$ ratio is equivalent to a not so predictable signal.

The order of extrapolation filter $FO_{sb}$ varies depending on the lengths of past samples used to compute extrapolation coefficients. For example, when L samples are used to compute an extrapolation filter coefficient, the maximum filter order is only Lth order. Furthermore, based on predictability level $Pr_{sb}$, the extrapolation filter order $FO_{sb}$ is adjusted accordingly in ST710 so that if the predictability level is high, the extrapolation filter order is reduced, or if the predictability level is low, the extrapolation filter order increases. This means, in other words, that the order and predictability level of the extrapolation filter are in inverse proportion: $FO_{sb} \propto (1/Pr_{sb})$.

In ST711, predictability level $Pr_{sb}$ of each subband is also used to determine whether extrapolation processing of generating a subband sample to conceal errors should be used or a subband replacement method for replacing an error frame should be used. An extrapolation flag is set so as to indicate this determination, and this flag is used when the next frame is also an error frame in ST720, and the same subband is supposed to use a signal generation scheme of the same type.

When the predictability level exceeds threshold value $Pr_{sb}$, the extrapolation flag is set to "1" in ST712 indicating that subbands are generated using a signal extrapolation method. When predictability is close to but above a threshold value, predictability level $Pr_{sb}$ is also used to influence the result of the extrapolation signal so as to adjust the result of the extrapolation signal. The signal extrapolation method generates the current sample by predicting it from the previous non-error sample to replace the current error frame using an AR model which is similar to that will be shown below, where $y(n)$ is a current extrapolated sample, $y(n-i)$ is a past output sample, $a_i$ is an extrapolation coefficient and p is a predictive child order.

$$y(n) = -a_1 y(n-1) - a_2 y(n-2) - \ldots - a_p y(n-p) \qquad \text{(Equation 1)}$$

The following is one of methods for influencing an extrapolation signal using the predictability level, where $\alpha$ is a factor of controlling the amount of influence on the extrapolation signal.

$$y(n) = (-a_1 y(n-1) - a_2 y(n-2) - \ldots - a_p y(n-p)) \times \alpha \log(Pr_{sb}) \qquad \text{(Equation 2)}$$

When predictability level $Pr_{sb}$ falls below a threshold value, the extrapolation flag is set to "0" in ST714, indicating that the subband replacement method is used in ST715. Likewise, the predictability level is also used to determine a replacement method to be used. When the predictability level slightly falls below the threshold value, the same subband from previous non-error frame P is repeated as the subbands. When this predictability level falls to well below the threshold value, subbands are simply replaced with random signals.

After ST716 in which it is checked whether or not all subbands are processed, K subbands are synthesized using a synthesis filterbank in ST717 and a generation signal for concealing the current error frame is reconstructed.

The following processing is performed on the subsequent error frames.

When it is shown in ST701 that the previous frame is also an error frame, the sample generation processing is continued from the time point at which the processing has stopped in the previous frame. Previously computed parameters such as the filter order, predictability level are reused. These parameters will never be recomputed. It is checked whether or not a specific subband needs to be generated, but this is indicated by the skip flag in ST718 and extrapolation flag in ST720. These flags are determined after the non-error frame up to the first error frame in ST704, ST705, ST707, ST711, ST712 and ST714.

In ST718, it is checked whether or not subbands can be excluded from signal generation. When subbands can be excluded as indicated in the skip flag, they are replaced with zeros in ST719. When subbands cannot be excluded from signal generation, it is checked in ST720 whether subbands should be generated through extrapolation or a replacement method should be used.

When subbands need to be generated, samples in the subband are re-generated using the sample extrapolation procedure in ST721 which is similar to that in ST713. The parameters already computed in ST708, ST709 and ST710 such as the filter order, filter coefficient and predictability level will be used in the extrapolation procedure as described above.

When subbands need not be generated, the subband replacement method is used in ST722. Depending on the predictability level, it is determined which replacement method is used; noise replacement or subband iteration as described above.

After the above described steps are repeated for all subbands in ST723, a time sample frame is reconstructed from K subbands re-generated to conceal error frames using the subband synthesis filterbank in ST717.

As described above, according to the present invention, it is possible to effectively conceal a single or a plurality of lost or corrupted frames. This is a reception side based error concealment scheme, which never causes a retransmission delay and produces little transmission overhead, and is therefore suitable for a real-time communication or transmission system. Since it can be used not as a codec dependent type but as a standalone module, this error concealment scheme is suitable for a wide range of audio application. Noise artifacts such as jerky sounds, echo effects or clicking noise are drastically reduced. An input signal is classified as speech and audio and an appropriate error concealment method can be applied for each type of signal. Furthermore, in detection of a transient signal and transient region, the present invention reduces the possibility that similar transient signals of a re-generation signal which can be offensive to the ear may be re-generated by selecting a suitable region of the frame of filter bank analysis. By decomposing a signal into small frequency bandwidths using a filterbank, it is possible to apply different signal re-generation schemes to the respective banks based on signal characteristics such as predictability level and importance in contribution of each subband to the overall signal. Extrapolation processing brings about a continuous signal, which solves the boundary discontinuity problem at the start point of an error frame which accounts for a main cause of noise artifacts. The discontinuity problem at an end of an error frame can be solved using backward extrapolation, signal mixing and signal level adjustment.

The case where the present invention is configured by hardware has been explained as an example here, but the present invention can also be implemented by software.

A first aspect of the present invention is an error concealment method characterized in that input data is classified into various characteristics and replacement data for concealing error data is generated by applying appropriate means, the method having the steps of:

(1a) detecting if a received frame is an error frame or non-error frame;

(1b) storing the non-error frame for future processing if the received frame is detected as the non-error frame, referred to as a "previous non-error frame";

(1c) classifying the error frame as a non-speech frame called a "probable speech frame" or "audio frame" if the received frame is detected as the error frame;

(1d) generating a replacement speech frame to replace the error frame if the error frame is classified as the speech frame;

(1e) generating a replacement audio frame to replace the error frame if the error frame is classified as the audio frame;

(1f) performing signal conditioning on the replacement frame;

(1g) performing boundary smoothing on the replacement frame; and (1h) storing the replacement frame for future processing.

A second aspect of the present invention is a method characterized in that the future processing according to steps (1b) and (1h) has iteration of one or a plurality of steps from steps (1b) to (1g).

A third aspect of the present invention is a method characterized in that the classification according to step (1c) is performed by computing auto-correlation of a previous non-error frame before the error frame and searching for the existence of a pitch period.

A fourth aspect of the present invention is a method characterized in that the pitch period according to the third aspect of the present invention is used to classify the error frame as the speech frame when the pitch period can be detected as the allowable pitch period and to classify the error frame as the audio frame when the pitch period cannot be detected.

A fifth aspect of the present invention is a method characterized in that the replacement speech frame generation processing according to step (1d) further has the steps of:

(5a) duplicating the previous non-error frame;

(5b) aligning the pitch period of the duplicate frame to the pitch period of the non-error frame to remove boundary discontinuity problem; and (5c) repeating the duplication processing and the alignment processing until one frame of the replacement frame is formed.

A sixth aspect of the present invention is a method characterized in that the replacement audio frame according to step (1e) is generated by being extrapolated from the non-error frame before the error frame, the method further having the steps of:

(6a) detecting whether or not the previous frame prior to the error frame is an attack signal;

(6b) selecting a suitable region for filterbank analysis from the previous frame;

(6c) performing filterbank analysis on the region selected from the previous frame to obtain K subbands, referred to as "K previous subbands";

(6d) determining importance of the respective error subbands of the error frame, referred to as "error subbands";

(6e) determining an order of a filter used for extrapolation, referred to as an "extrapolation filter order";

(6f) computing a filter coefficient using the previous subband to be used in extrapolation processing, referred to as an "extrapolation filter coefficient";

(6g) determining how predictable is the previous subband, referred to as "predictability level Pr";

(6h) adjusting the filter order of an extrapolation filter based on the predictability level, referred to as "extrapolation filter order FO"; and (6i) generating a replacement subband for the error subband.

A seventh aspect of the present invention is a method characterized in that the signal conditioning according to step (1f) is performed by adjusting a signal of the replacement frame so that the signal level is close to a previous frame to reduce artifacts caused by a sudden change of the signal level.

An eighth aspect of the present invention is a method characterized in that the boundary smoothing according to step (1g) is realized by using backward extrapolation to generate a short segment of samples from a subsequent frame and then cross fading and mixing the segment with the replacement frame to reduce artifacts caused by the problem of boundary discontinuity.

A ninth aspect of the present invention is a method characterized in that the suitable region according to step (6b) is a region from the onset of an attack signal in the previous frame to an end of the previous frame or the suitable region is the entire previous frame if the attack signal is not detected.

A tenth aspect of the present invention is a method characterized in that bandwidths of the subbands according to step (6c) may be equal or unequal so that lower frequency region have the smaller bandwidth than the higher frequency region or any possible configuration.

An eleventh aspect of the present invention is a method characterized in that the importance of the error subband according to step (6d) is decided by how significant is the contribution of the subband to the previous non-error frame.

A twelfth aspect of the present invention is a method characterized in that the filter order according to step (6e) is computed by dividing the length of the region selected in step (6b) of the sixth aspect of the present invention by the number of subbands of filterbank analysis.

A thirteenth aspect of the present invention is a method characterized in that the extrapolation filter coefficient according to step (6f) is computed by the Berg's algorithm using the previous subband as an input. The filter coefficient is used by an AR filter to extrapolate samples using samples of the previous subband.

A fourteenth aspect of the present invention is a method characterized in that the predictability level Pr according to step (6g) is derived from a predicted error residue computed from the Berg's algorithm, which is proportional to the ratio of the predicted residue $E_0$ computed before the Berg's algorithm over the predicted residue $E_1$ computed after the Berg's algorithm, referred to as $Pr \propto E_0/E_1$.

A fifteenth aspect of the present invention is a method characterized in that the extrapolation filter order FO according to step (6h) is adjusted based on predictability level Pr and the extrapolation filter order is inversely proportional to the value of the predictability level, referred to as $FO \propto (1/Pr)$, so that if the predictability level is high, the extrapolation filter order is reduced, or if the predictability level is low, the extrapolation filter order increases.

A sixteenth aspect of the present invention is a method characterized in that the replacement subband according to step (6i) is generated depending on the condition of the importance and the predictability level of the previous subband, the method further having the steps of:

(16a) generating the replacement subband for the error subband using signal extrapolation, referred to as "subband extrapolation", if the error subband is classified as important in step (6d) and the predictability level is above a predetermined threshold value;

(16b) generating the replacement subband for the error subband by replacing the error subband with the corresponding previous subband from the previous non-error frame, referred to as "subband repetition", if the error subband is classified as important in step (6d) and the predictability level is just below but close to a predetermined threshold value;

(16c) generating the replacement subband for the error subband by replacing the error subband with noise, referred to as "noise replacement", if the error subband is classified as important in step (6d) and the predictability level is any other value; and (16d) generating the replacement subband for the error subband by replacing the error subband with zeros, referred to as "silence replacement", if the error subband is classified as unimportant in step (6d).

A seventeenth aspect of the present invention is a method characterized in that the replacement subband according to step (16a) is further influenced by predictability level Pr and the extrapolation value is adjusted by a scaled version of the predictability level Pr as follows:

$$y(n)=(-a_1y(n-1)-a_2y(n-2)-\ldots-a_py(n-p))\times \alpha \log(Pr) \quad \text{(Equation 3)}$$

An eighteenth aspect of the present invention is a method of generating a replacement frame for an error frame by extrapolating from a non-error frame prior to the error frame, the method having the steps of:

(18a) detecting if the previous frame prior to the error frame is an attack signal;

(18b) selecting a suitable region from the previous frame for analysis;

(18c) performing filterbank analysis on the region selected from the previous frame to obtain K subbands, referred to as "K previous subbands";

(18d) determining importance of the respective error subbands of the error frame, referred to as "error subbands";

(18e) determining an order of a filter used for extrapolation, referred to as an "extrapolation filter order";

(18f) computing a filter coefficient using the previous subband to be used in the extrapolation processing, referred to as an "extrapolation filter coefficient";

(18g) determining how predictable is the previous subband, referred to as a "predictability level";

(18h) adjusting the filter order of an extrapolation filter based on the predictability level; and (18i) generating a replacement subband for the error subband.

A nineteenth aspect of the present invention is a method characterized in that the suitable region according to step (18b) is a region from the onset of an attack signal in the previous frame to the end of the previous frame or the suitable region is the entire previous frame if the attack signal is not detected.

A twentieth aspect of the present invention is a method characterized in that bandwidths of the subbands according to step (18c) may be equal or unequal so that lower frequency region have smaller bandwidth than the higher frequency region or any possible configuration.

A twenty-first aspect of the present invention is a method characterized in that the importance of each error subband according to step (18d) is decided by how significant is the contribution of the subband to the previous non-error frame.

A twenty-second aspect of the present invention is a method characterized in that the filter order according to step (18e) is computed by dividing the length of the region selected in step (18b) by the number of subbands of filterbank analysis.

A twenty-third aspect of the present invention is a method characterized in that the extrapolation filter coefficient according to step (18f) is computed by Berg's algorithm using the previous subband as an input. The filter coefficient is used by an AR filter to extrapolate samples using samples of the previous subband.

A twenty-fourth aspect of the present invention is a method characterized in that the predictability level Pr according to step (18g) is derived from a predicted error residue computed from the Berg's algorithm, which is proportional to the ratio of the predicted residue $E_0$ computed before the Berg's algorithm over the predicted residue $E_1$ computed after the Berg's algorithm, referred to as $Pr \propto E_0/E_1$.

A twenty-fifth aspect of the present invention is a method characterized in that the extrapolation filter order FO according to step (18h) is adjusted based on predictability level Pr and the extrapolation filter order is inversely proportional to the value of the predictability level, referred to as $FO \propto (1/Pr)$ so that if the predictability level is high, the extrapolation filter order is reduced or if the predictability level is low, the extrapolation filter order increases.

A twenty-sixth aspect of the present invention is a method characterized in that the replacement subband according to step (18i) is generated depending on the condition of the importance and the predictability level of the previous subband, the method further having the steps of:

(26a) generating the replacement subband for the error subband using signal extrapolation, referred to as "subband extrapolation", if the error subband is classified as important in step (16d) and the predictability level is above a predetermined threshold value;

(26b) generating the replacement subband for the error subband by replacing the error subband with the corresponding previous subband from the previous non-error frame, referred to as "subband repetition", if the error subband is classified as important in step (16d) and the predictability level is just below but close to a predetermined threshold value;

(26c) generating the replacement subband for the error subband by replacing the error subband with noise, referred to as "noise replacement", if the error subband is classified as important in step (16d) and the predictability level is any other value; and (26d) generating the replacement subband for the error subband by replacing the error subband with zeros, referred to as "silence replacement", if the error subband is classified as unimportant in step (16d).

A twenty-seventh aspect of the present invention is a method characterized in that the replacement subband according to step (26a) is further influenced by predictability level Pr and the extrapolation value is adjusted by a scaled version of the predictability level Pr as follows:

$$y(n)=(-a_1y(n-1)-a_2y(n-2)-\ldots-a_py(n-p))\times\alpha\log(Pr) \quad \text{(Equation 4)}$$

A twenty-eighth aspect of the present invention is a method of generating a replacement subband for an error frame based on the condition of the importance and predictability level Pr of the previous subband, the method further having the steps of:

(28a) generating the replacement subband for the error subband using signal extrapolation, referred to as "subband extrapolation", if the error subband is classified as important and the predictability level is above a predetermined threshold value;

(28b) generating the replacement subband for the error subband by replacing the error subband with the corresponding previous subband from the previous non-error frame, referred to as "subband repetition", if the error subband is classified as important and the predictability level is just below but close to a predetermined threshold value;

(28c) generating the replacement subband for the error subband by replacing the error subband with noise, referred to as "noise replacement", if the error subband is classified as important and the predictability level is any other value; and (28d) generating the replacement subband for the error subband by replacing the error subband with zeros, referred to as "silence replacement", if the error subband is classified as unimportant.

A twenty-ninth aspect of the present invention is a method characterized in that the replacement subband according to step (28a) is further influenced by predictability level Pr and the extrapolation value is adjusted by a scaled version of the predictability level Pr as follows:

$$y(n)=(-a_1y(n-1)-a_2y(n-2)-\ldots-a_py(n-p))\times\alpha\log(Pr) \quad \text{(Equation 5)}$$

A thirtieth aspect of the present invention is a method of selecting a suitable region from a non-error frame for filterbank analysis, the method having the steps of:

(30a) searching for a sudden onset of an attack signal in the non-error frame; and (30b) selecting a region for the filterbank analysis.

A thirty-first aspect of the present invention is a method characterized in that if the onset of an attack signal exists in the non-error frame, the region is selected in step (30b) from the onset of the attack signal to the end of the non-error frame or if no attack signal exists in the non-error frame, the entire region of the non-error frame is selected in step (30b).

A thirty-second aspect of the present invention is a method of computing a filter order of an extrapolation filter, the method having the steps of:

(32a) searching for a sudden onset of an attack signal in a non-error frame;

(32b) calculating the length for deriving a filter order; and (32c) computing the filter order by dividing the length by the number of subbands for filterbank analysis.

A thirty-third aspect of the present invention is a method characterized in that if the onset of an attack signal exists in the non-error frame, the length is selected in step (32b) from the onset of the attack signal to the end of the non-error frame or if no attack signal exists in the non-error frame, the entire region of the non-error frame is selected as the length in step (32b).

A thirty-fourth aspect of the present invention is a method of adjusting an order of an extrapolation filter, the method having the steps of:

(34a) setting an initial order of a filter used for extrapolation, referred to as an "extrapolation filter order";

(34b) computing a filter coefficient used in the subband extrapolation processing, referred to as an "extrapolation filter coefficient";

(34c) determining how predictable is the subband, referred to as "predictability level Pr"; and (34d) adjusting the filter order of the extrapolation filter based on the predictability level, referred to as "extrapolation filter order FO."

A thirty-fifth aspect of the present invention is a method characterized in that the extrapolation filter coefficient according to step (34b) is computed by Berg's algorithm using samples of the subband.

A thirty-sixth aspect of the present invention is a method characterized in that the predictability level Pr according to step (34c) is derived from a predicted error residue computed from Berg's algorithm, which is proportional to the ratio of the predicted residue $E_0$ computed before Berg's algorithm over the predicted residue $E_1$ computed after Berg's algorithm, referred to as $Pr^\infty E_0/E_1$.

A thirty-seventh aspect of the present invention is a method characterized in that the extrapolation filter order FO according to step (34d) is adjusted based on predictability level Pr and the extrapolation filter order is inversely proportional to the value of the predictability level, referred to as $FO^\infty(1/Pr)$ so that if the predictability level is high, the extrapolation filter order is reduced, or if the predictability level is low, the extrapolation filter order increases.

A thirty-eighth aspect of the present invention is a subband selection method for generating a replacement frame, the method having the steps of:
(38a) determining the importance of each error subband for a frame;
(38b) determining how predictable is the previous subband, referred to as "predictability level Pr"; and
(38c) selecting a subband replacement method.

A thirty-ninth aspect of the present invention is a method characterized in that the importance of each error subband according to step (38d) is decided by how significant is the contribution of the subband to the frame.

A fortieth aspect of the present invention is a method characterized in that the predictability level Pr according to step (38b) is derived from a predicted error residue computed from Berg's algorithm, which is proportional to the ratio of the predicted residue $E_0$ computed before Berg's algorithm over the predicted residue $E_1$ computed after Berg's algorithm, referred to as $Pr^\infty E_0/E_1$.

A forty-first aspect of the present invention is a method characterized in that the replacement method according to step (38c) is selected based on the condition of the importance and the predictability level of the subband, the method further having the steps of:
(41a) selecting a signal extrapolation method if the subband is classified as important in step (38a) and the predictability level is above a predetermined threshold value;
(41b) selecting a subband iteration method if the error subband is classified as important in step (38a) and the predictability level is just below but close to a predetermined threshold value;
(41c) selecting a noise replacement method if the error subband is classified as important in step (38a) and the predictability level is any other value; and
(41d) selecting a silent replacement method if the error subband is classified as not important in step (38a).

The above described respective functional blocks are typically implemented as LSIs, integrated circuits. These functional blocks may be individually integrated on a single chip or may also be integrated on a single chip so as to include a part or the whole thereof.

Here, the term "LSI" is used, but it may also be referred to as "IC", "system LSI", "super LSI" or "ultra-LSI" or the like depending on the difference in the degree of integration.

Furthermore, the technique of implementing an integrated circuit is not limited to an LSI, but an integrated circuit may also be implemented with a dedicated circuit or general-purpose processor. It is also possible to use an FPGA (Field Programmable Gate Array) which is programmable after manufacturing an LSI or a reconfigurable processor whereby connections or settings of circuit cells inside the LSI are reconfigurable.

Moreover, when technologies for implementing an integrated circuit substitutable for an LSI emerges with the advance of semiconductor technologies or other derived technologies, those technologies may be naturally used to integrate functional blocks. There is a possibility of application of a biotechnology or the like.

The present application is based on Japanese Patent Application No. 2004-061797 filed on Mar. 5, 2004, entire content of which is expressly incorporated by reference herein.

INDUSTRIAL APPLICABILITY

The present invention is suitable for use as a concealment technology for lost or corrupted digital audio signals (errors) in the area of transmission, delivery and storage medium.

The invention claimed is:

1. An error concealing apparatus comprising:
a detection section that detects, when an error frame is generated, a non error frame prior to said error frame;
a decision section that decides whether the detected non error frame is a speech frame or an audio frame;
a replacement speech frame generation section that generates a replacement frame for said error frame from the non error frame decided to be a speech frame;
a replacement audio frame generation section that generates a replacement frame for said error frame from the non error frame decided to be an audio frame; and
a replacement section that replaces the replacement frame generated by said replacement speech frame generation section or said replacement audio frame generation section for said error frame so as to conceal said error frame, wherein:
said replacement audio frame generation section comprises:
a transient signal detection section that detects a start position of a transient signal included in said non error frame; and
an exclusion section that excludes parts before the start position of the transient signal detected by said transient signal detection section from said non error frame in generating said replacement frame.

2. The error concealing apparatus according to claim 1, wherein said replacement audio frame generation section comprises:
a division section that divides said non error frame decided to be an audio frame into signals of a plurality of frequency bands; and
a generation section that generates said replacement frame by performing extrapolation on said signals of the plurality of frequency bands.

3. The error concealing apparatus according to claim 1, wherein said replacement audio frame generation section comprises:
a division section that divides said non error frame decided to be an audio frame into signals of a plurality of frequency bands;
a computation section that computes the degree of periodicity for each of said signals of the plurality of frequency bands; and
a generation section that generates said replacement frame by performing processing corresponding to the degree of periodicity computed by said computation section on said signals of the plurality of frequency bands respectively.

4. The error concealing apparatus according to claim 3, wherein said generation section generates said replacement frame with noise or other signals obtained by said division section when the degree of periodicity computed by said computation section is low and performs extrapolation on said signals of the plurality of frequency bands when the degree of periodicity computed by said computation section is high.

5. The error concealing apparatus according to claim 1, wherein said replacement speech frame generation section comprises:
　a duplication section that generates a replica of part of said non error frame; and
　an adjusting section that adjusts a replacement position of said replica with respect to said error frame such that a pitch period of said replica matches a pitch period of said non error frame.

6. The error concealing apparatus according to claim 1, wherein said replacement speech frame generation section comprises:
　a duplication section that duplicates part of said non error frame;
　an adjusting section that adjusts a duplication segment in said duplication section such that a pitch period of the replica obtained by said duplication section matches a pitch period of said non error frame; and
　a generation section that generates said replacement frame using the replica obtained by said duplication section.

7. The error concealing apparatus according to claim 1, wherein said replacement section performs smoothing on a frame boundary of the replacement frame generated by said replacement speech frame generation section or said replacement audio frame generation section.

8. A communication terminal apparatus comprising the error concealing apparatus according to claim 1.

9. An error concealing method comprising:
　a detection step of detecting, when an error frame is generated, a non error frame prior to said error frame;
　a decision step of deciding whether the detected non error frame is a speech frame or an audio frame;
　a replacement speech frame generation step of generating a replacement frame of said error frame from the non error frame decided to be a speech frame;
　a replacement audio frame generation step of generating a replacement frame of said error frame from the non error frame decided to be an audio frame; and
　a replacement step of replacing the replacement frame generated in said replacement speech frame generation step or said replacement audio frame generation step for said error frame so as to conceal said error frame, wherein:
said replacement audio frame generation step further comprises:
　detecting a start position of a transient signal included in said non error frame, and
　excluding parts before the start position of the detected transient signal from said non error frame in generating said replacement frame.

* * * * *